(12) United States Patent
Mackie et al.

(10) Patent No.: US 11,548,069 B2
(45) Date of Patent: Jan. 10, 2023

(54) THREE-DIMENSIONAL PRINTER LAMINATING FUSIBLE SHEETS

(71) Applicant: Wisconsin Alumni Research Foundation, Madison, WI (US)

(72) Inventors: Thomas Rockwell Mackie, Verona, WI (US); Brandon Joseph Walker, Madison, WI (US); Nathan Donald Schumacher, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 552 days.

(21) Appl. No.: 16/417,177

(22) Filed: May 20, 2019

(65) Prior Publication Data
US 2020/0368813 A1 Nov. 26, 2020

(51) Int. Cl.
*B22F 10/20* (2021.01)
*B29C 64/147* (2017.01)
*B29C 64/386* (2017.01)
*B29C 64/264* (2017.01)
*B29C 64/393* (2017.01)
(Continued)

(52) U.S. Cl.
CPC .......... *B22F 10/20* (2021.01); *B29C 64/147* (2017.08); *B29C 64/188* (2017.08); *B29C 64/205* (2017.08); *B29C 64/218* (2017.08); *B29C 64/227* (2017.08); *B29C 64/245* (2017.08); *B29C 64/264* (2017.08); *B29C 64/314* (2017.08); *B29C 64/386* (2017.08); *B32B 38/1808* (2013.01); *B22F 10/30* (2021.01); *B29C 65/14* (2013.01); *B32B 37/00* (2013.01); *B32B 37/14* (2013.01); *B33Y 10/00* (2014.12); *B33Y 30/00* (2014.12); *B33Y 40/00* (2014.12)

(58) Field of Classification Search
CPC ..... B29C 64/40; B29C 64/147; B29C 64/264; B29C 64/268; B29C 64/277; B29C 71/04; B29C 64/153; B29C 64/218; B29C 64/227; B29C 64/245; B29C 64/393; B22F 3/1055; B22F 2003/1056; B22F 2003/1057; B22F 2003/1058; B22F 2003/1059; B22F 10/20; B32B 38/1808
See application file for complete search history.

(56) References Cited

U.S. PATENT DOCUMENTS 5,031,120 A   7/1991  Pomerantz et al.
5,174,843 A * 12/1992  Natter ............... B29C 64/40
                                              156/155

(Continued)

FOREIGN PATENT DOCUMENTS

KR    20150113476 A    10/2015

OTHER PUBLICATIONS

International Search Report of International Application No. PCT/US2020/032421, dated Aug. 24, 2020.
(Continued)

*Primary Examiner* — Philip C Tucker
*Assistant Examiner* — Jimmy R Smith, Jr.
(74) *Attorney, Agent, or Firm* — Boyle Fredrickson, S.C.

(57) ABSTRACT

A 3D printer successively fuses sheet material in a stack to form a three-dimensional object. The sheet material may provide a mesh separating islands of material that will be fused to produce the desired three-dimensional object. The mesh provides support for the island material during the fusing process and may be removed afterwards.

19 Claims, 4 Drawing Sheets

(51) Int. Cl.
*B33Y 30/00* (2015.01)
*B32B 38/18* (2006.01)
*B29C 64/188* (2017.01)
*B29C 64/314* (2017.01)
*B29C 64/218* (2017.01)
*B29C 64/245* (2017.01)
*B29C 64/227* (2017.01)
*B29C 64/205* (2017.01)
*B33Y 10/00* (2015.01)
*B33Y 40/00* (2020.01)
*B22F 10/30* (2021.01)
*B29C 65/14* (2006.01)
*B32B 37/14* (2006.01)
*B32B 37/00* (2006.01)

(56) References Cited

U.S. PATENT DOCUMENTS

| | | |
|---|---|---|
| 5,192,559 A | 3/1993 | Hull et al. |
| 5,637,175 A | 6/1997 | Feygin et al. |
| 5,876,550 A | 3/1999 | Feygin et al. |
| 6,190,602 B1 | 2/2001 | Blaney et al. |
| 6,450,393 B1 | 9/2002 | Doumanidis et al. |
| 6,602,377 B1 | 8/2003 | Bar-Erez et al. |
| 6,780,368 B2* | 8/2004 | Liu ............... B33Y 10/00 264/401 |
| 2008/0145630 A1 | 6/2008 | Sun et al. |
| 2011/0241947 A1 | 10/2011 | Scott et al. |
| 2014/0035423 A1* | 2/2014 | Veronesi ........ H02K 15/0012 310/194 |
| 2014/0336680 A1* | 11/2014 | Medina ............ B23K 35/0244 219/121.72 |
| 2015/0025135 A1 | 1/2015 | Liu et al. |
| 2015/0321417 A1* | 11/2015 | Mironets .............. B23P 15/00 156/263 |
| 2018/0229332 A1 | 8/2018 | Tsai et al. |
| 2019/0344381 A1* | 11/2019 | Pomerantz ........... B33Y 80/00 |

OTHER PUBLICATIONS

Chen Chen et al.; "A Foil-Based Additive Manufacturing Technology for Metal Parts"; Journal of Manufacturing Science and Engineering; vol. 139 / 024501-1; dated Feb. 2017—(6) pages.

\* cited by examiner

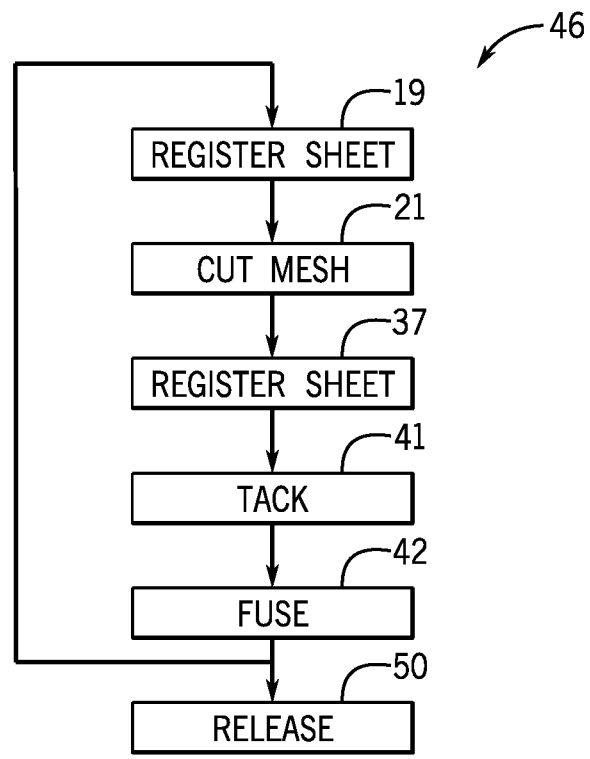
FIG. 4
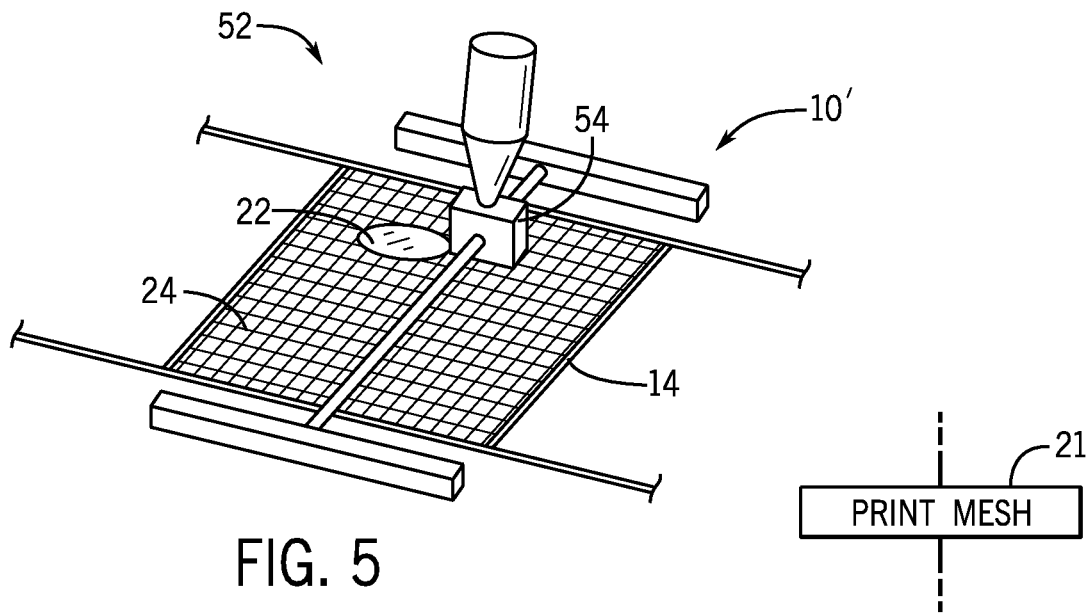
FIG. 5
FIG. 6

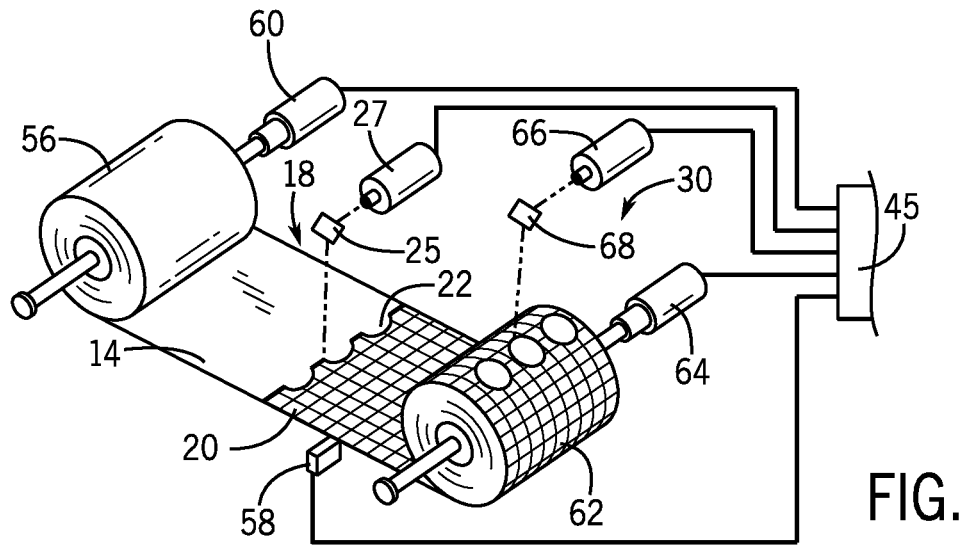
FIG. 7
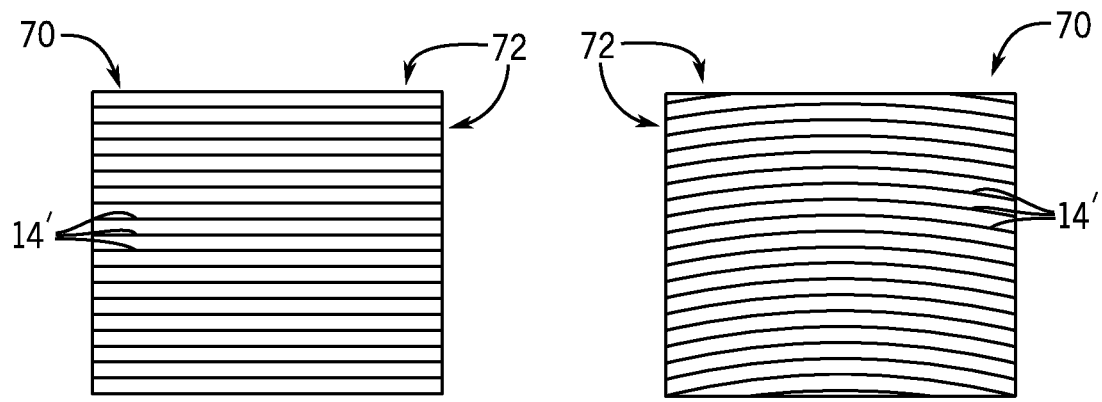
FIG. 8
FIG. 9
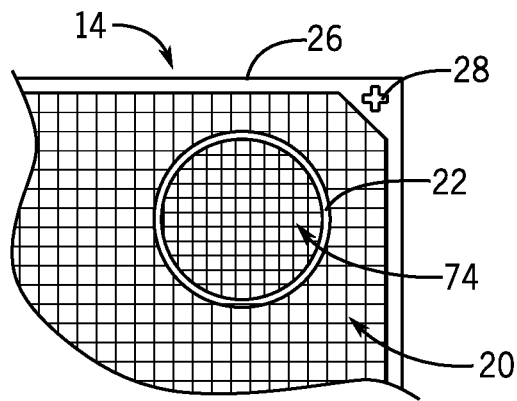
FIG. 10

THREE-DIMENSIONAL PRINTER LAMINATING FUSIBLE SHEETS

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to three-dimension printers and in particular to a printer that fuses perforated sheets into a three-dimensional object.

Three-dimension printers implementing additive machining may create printed objects by selectively depositing a thin layer of material in a printed pattern onto a print bed and applying additional layers of material on the previously printed layers in a layer-by-layer fashion until the full object is formed.

A variety of different 3D printing technologies exist. Photo polymerization techniques use lasers to polymerize a thin surface of liquid above the print bed, the latter of which is gradually drawn beneath the liquid surface as the object is built up with succeeding polymerizations. Extrusion techniques use a similar approach but extrude material such as molten plastic from a nozzle in successive layers on the print bed.

Metal objects, particularly those with high surface finish and accuracy, are often constructed by 3D printers using powder bed techniques. In this technique, the print bed is coated with a thin layer of metal powder that is fused together with an electron beam or laser. The build surface is then moved downward, and a new layer of powder spread over the previous layer and this process repeated.

The metal powers used for powder bed printing are expensive, in part because of a requirement of high particle uniformity and small size, for example, being up to 10 times the cost of comparable weight of solid metal stock.

The use of powder also requires careful tuning of the scanning beam to prevent spatter that can occur when metal flies out of the pool of melting powder, porosity caused by gaps if the powder fuses unevenly, or combustion promoted by the high surface area of the heated powder material. These effects operate to limit the speed of the printing process and reduce the consistency of the printed part.

SUMMARY OF THE INVENTION

The present invention provides a 3D printing process using perforated sheets in place of layers of powder. Metal sheets are readily available at lower cost than powder materials, and greatly reduce the possibility of spatter and porosity because of the continuous nature of sheet material which reduces voids and provides improved thermal conductivity eliminating hotspots. Combustion risk is also decreased by the lower surface area to volume ratio of a sheet (even when perforated) compared to fine powder and improved cross layer thermal conductivity. When an electron beam is used for the fusing, the inherent electrical interconnection of the areas of the perforated sheet provide a good grounding path eliminating the need for pre-fusing to establish electrical grounding channels. Each of these factors contributes to higher speed, lower cost, and higher safety 3D printing.

Specifically, in one embodiment, the present invention provides a three-dimension printer for fabricating a structure and includes a laminator receiving sheet material and applying it in layers to previous layers of sheet material and a fusing energy beam directable to an exposed surface of an outermost layer to controllably melt the outermost layer after it is applied to the previous layers. A controller coordinates operation of the laminator and fusing energy beam to fuse each applied layer from the laminator to a previous layer using the fusing energy beam in a repeating operation to produce an integrated solid volume of mutually fused layers forming the fabricated structure.

It is thus one feature of at least one embodiment of the invention to provide an improved 3D printing process that reduces the problems and costs associated with powder feedstock.

The three-dimensional printer may include a perforator receiving the sheet material and cutting perforations in the sheet material before it is applied to previous layers of sheet material.

It is thus one feature of at least one embodiment of the invention to provide a sheet material that is pre-prepared to be better tailored to the particular structure being fabricated.

The controller may execute a program stored in non-transitory medium to control the perforator to produce a mesh network around islands of the sheet material, the islands fused to form the integrated solid volume, and the mesh supporting the islands during the fusing process.

It is thus one feature of at least one embodiment of the invention to provide a sheet material that offers a supporting structure for the fused materials of the fabricated structure, stabilizing that structure or providing electrical grounding during the fusing process.

The perforations may be sized so that they can be removed from the integrated solid volume of mutually fused layers through at least one of bead blasting, tearing, or electrolytic erosion.

It is thus one feature of at least one embodiment of the invention to provide a supporting structure that can be readily removed by common manufacturing techniques.

The mesh network around the islands may provide a narrowed neck portion joining struts of the mesh network to the islands, wherein the narrowed neck portions are preferentially broken through at least one of bead blasting, tearing, or electrolytic erosion.

It is thus one feature of at least one embodiment of the invention to allow larger supporting struts for stabilizing the island regions while ensuring ready removal of those struts from the fabricated item at a later time.

The islands may include internal perforations.

It is thus one feature of at least one embodiment of the invention to provide the benefits of internal cavities that produce lightweight yet strong parts.

The fusing energy beam may be an area beam simultaneously directing fusing energy to the exposed surface of the outermost layer over an area of at least one square centimeter. The fusing energy beam may extend to simultaneously fuse the part and the surrounding mesh material support with the porous and perforated nature of the surrounding mesh material allowing easy removal later with bead blasting or electrolytic means. The area beam may also be a thick strip of energy moving across the build plane. The area beam may not necessarily be contiguous and could be broken up into smaller beamlets.

It is thus one feature of at least one embodiment of the invention to permit a parallel fusing process greatly improving the speed of fabrication.

The fusing energy may be at least one electron beam directed to the exposed surface of the outermost layer and the three-dimensional printer may further include a grounding electrode for grounding the outermost layer with respect to the electron beam.

It is thus one feature of at least one embodiment of the invention to provide a 3D printer readily adapted to large area electron beams by using the sheet material to provide an interconnected grounded target.

Alternatively, the fusing energy beam may be a steerable beam adapted to fuse successive layers of sheet material.

It is thus one feature of at least one embodiment of the invention to provide a system that can provide selective fusing of either untreated mesh material or mesh material having additive printing.

The three-dimensional printer may further include a printer adapted to receive a mesh sheet material and selectively print fusible material onto the mesh to produce islands fusible by the fusing energy beam to form the integrated solid volume with a remaining mesh supporting the islands during the fusing process.

It is thus one feature of at least one embodiment of the invention to integrate an additive process to the printer, for example, that allows use of standard stock mesh materials.

The printer may be adapted to print a metal powder fusible to a material of the mesh sheet by the fusing energy beam.

It is thus one feature of at least one embodiment of the invention to take advantage of metal powders and the like existing for 3D printing while reducing the problems associated with a pure powder system.

The laminator may produce a stack of planar layers supported on a support surface.

It is thus one feature of at least one embodiment of the invention to provide a simple printing system usable with planar sheets of material.

Alternatively, the laminator may produce a roll of curved layers wrapped around a roller.

It is thus one feature of at least one embodiment of the invention to provide a continuous sheet implementation that simplifies registration and stabilization of the layers during the printing process.

The three-dimensional printer may further include a tack welder tacking each layer to a preceding layer prior to a fusing of each applied layer using the fusing energy beam.

It is thus one feature of at least one embodiment of the invention to provide a simple method of stabilizing the sheets during the fusing process.

More generally, the invention may provide a method of fabricating three-dimensional objects by applying a set of mesh sheets successively in a stack and, as each given mesh sheet is applied to the stack, applying an energy beam to an exposed surface of the given mesh sheet to fuse the given mesh sheet to a previously fused underlying mesh sheet to create a set of islands together fused to form a predetermined three-dimensional shape, the islands surrounded by mesh. The three-dimensional shape may then be separated from the surrounding mesh by at least one of bead blasting, tearing, or electrolytic erosion.

It is thus one feature of at least one embodiment of the invention to provide a fabrication method using mesh sheets for improved material handling.

The mesh sheets may be woven metal mesh.

It is thus one feature of at least one embodiment of the invention to provide a feedstock for three-dimensional printing that can take advantage of pre-existing, low cost stock mesh materials.

These particular objects and advantages may apply to only some embodiments falling within the claims and thus do not define the scope of the invention.

BRIEF DESCRIPTION OF THE DRAWINGS

FIG. 4 is a flowchart of the steps executed by a program of the computer of FIG. 1;

FIG. 5 is a fragmentary perspective view of an in-line printing station that can replace the perforation station of FIG. 1 to print the islands of FIG. 2 into a pre-existing mesh structure;

FIG. 6 is a fragmentary flowchart showing a process block replacing a process block of FIG. 4 with respect to the program of the computer of FIG. 1 when used with the in-line printing station;

FIG. 7 is a figure similar to that of FIG. 1 showing an alternative embodiment providing for the handling of the mesh material by an unwinding and winding between two spools as a continuous material;

FIG. 8 and FIG. 9 show vertical, elevational cross-sections through a printed solid produced by the technique of FIG. 1 and by the technique of FIG. 7 respectively and indicating the different configurations of the internal laminations of these solids;

FIG. 10 is a figure similar to that of FIG. 2 showing an island area with internal perforations for improved strength-to-weight ratio in the printed solid;

DETAILED DESCRIPTION OF THE PREFERRED EMBODIMENT

Figures 1, 2, 3:
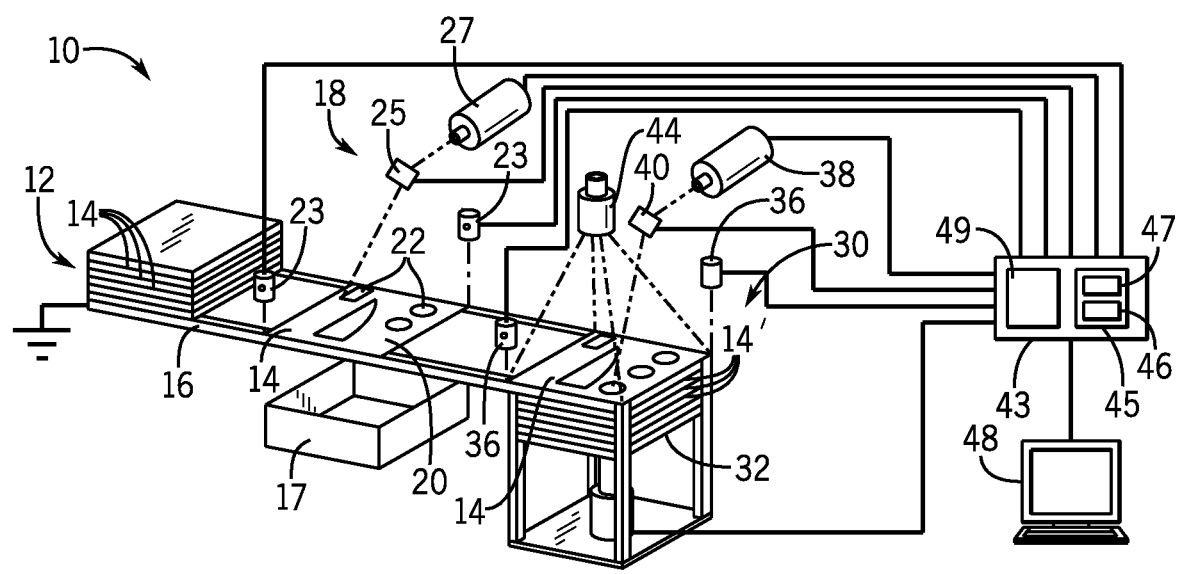
FIG. 1 is a simplified perspective view of a 3D printer constructed according to the present invention showing a perforation station and a lamination/fusing station controlled by an electronic computer.
FIG. 2 is a fragmentary top plan view of a perforated sheet created by the perforation station of FIG. 1 showing islands that will form a printed solid surrounded by supporting mesh which will be removed.
FIG. 3 is a detailed fragmentary view of an interface between the supporting mesh and the islands showing a neck portion facilitating removal of the island portions from the supporting mesh after fusion.

Referring now to FIG. 1, a 3D printer 10 constructed per the present invention may provide for a sheet tray 12 holding a stack of thin metal sheets 14. In one embodiment, each sheet 14 will be planar and may be cut to a convenient shape such as a rectangle or square. The materials of the sheets 14 may be a pure metal or alloy, including but not limited to materials such as steel, aluminum, and titanium. Generally, the invention contemplates that the sheets 14 may be constructed of any metal or alloys used for 3D printing processes such as direct metal laser sintering and the like.

The surfaces of the sheets 14 will be preferably clear of oxidation and other contamination and may optionally include a thin flux coating. The sheets 14 need not be homogenous sheets 14 but may be clad or plated materials.

A nonlimiting example of a thin metal sheet 14 is a 30 cm×30 cm×50 μm thick sheet of 302 stainless steel foil.

The sheet tray 12 may allow the sheets 14 to be individually removed from a stack and transported by a carrier track 16 to a perforation station 18 per process block 19 of FIG. 4. Registration of the sheets 14 at the perforation station 18 may be provided by registration cameras 23 or other known registration techniques including limit switches, stops, and the like.

When the sheets 14 are positioned at the perforation station 18, perforations may be cut in the sheets 14 to provide one or more mesh areas 20 surrounding one or more islands 22 per process block 21 of FIG. 4. The islands 22 may be, in one embodiment, continuous areas which will be laminated with other similar islands 22 on flanking sheets 14 to form integrated layers of a printed object as will be discussed below. The perforations may be made by a laser 27 positioned over the upper exposed surface of the sheet 14 with its beam guided over the sheet 14 to different locations by a galvanometer-driven mirror 25 or by using carriages (not shown) for movement of the laser 27 itself. The perforation process may vaporize portions of the sheet 14 to create the desired perforations in the mesh area 20 surrounding the islands 22 or the perforation process may cut around areas of the sheet 14 so that portions of the sheet 14 may fall out of the sheet 14, for example, into a collection hopper 17. Fully removed regions of sheet allow connected voids to be created in the 3-D fabricated part that are completely free of material to be removed and would be particularly useful for example, for creating reservoirs and embedded tubing.

It will be appreciated that other techniques may be used to make the necessary perforations including, for example, the use of electron beams or other high-energy beams. In when electron beams are used, the carrier track 16 may be grounded to provide a grounding electrode in electrical communication with the sheet 14 to ground the sheet and all of its elements (the islands 22 and the mesh area 20) through the interconnecting portions of the sheet 14. When electron beams are used, the galvanometer-driven mirror 25 may be replaced by an electromagnetic deflection system.

Referring also to FIG. 2, each of the islands 22 will correspond to a slice of a 3D object intended to be printed. The 3D object may be first described using a standard computer aided design program (CAD) which may produce a standard tessellation language file, for example, using the STL format. The slices describing each of the islands 22 may then be generated by a conventional slicer program of a type well known in the art.

Outside of the islands 22, in the mesh areas 20, a regular geometric or irregular mesh pattern may be formed by the perforation process to produce a network of thin metal struts 24. The struts 24 operate to position and retain the islands 22 precisely within the plane of the sheet 14 so that the islands 22 will properly align with other islands 22 of a previous sheet 14' to which the current sheet 14 will be fused.

Figure 12:
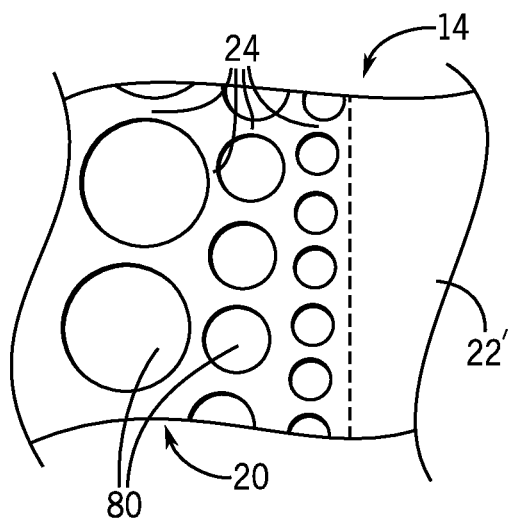
FIG. 12 is a figure similar to FIG. 2 showing a mesh pattern formed of multiple sizes of holes.

Referring momentarily to FIG. 12, these struts 24 may, but need not be rectilinear or arranged at regular spacings in a Cartesian coordinate system or following a regular pattern of tessellation. In one embodiment, the mesh region 20 may be formed of holes 80 of varying diameters to provide struts 24 of varying thicknesses between hole centers. In this embodiment, smaller diameter holes having finer struts 24 may be placed close to the islands 22 to provide for faster release of the islands 22 by abrasion, chemical etching, or the like. Further away from the islands 22 larger holes 24 may be provided with thicker struts 24 providing greater rigidity over these larger areas and faster cutting per area of the hole 80 when the holes 80 are formed for example by a laser cutting process or other high energy beam such as an electron beam.

Desirably, the struts 24 are also constructed to be readily removed from the 3D object being printed which is formed of the fused islands 22 after the fusing process is complete. The metal struts 24 create a network of openings and other features that assist in the later removal of the metal struts 24 as will be described below. In this regard, the mesh area 20 need occupy only a narrow region around each of the islands 22 necessary for release of the islands 22 later in the fabrication process. For this reason, other regions of the sheets 14 may be advantageously filled with arbitrary standard solid geometric shapes independent of the principal printed part to be fabricated. These solid geometric shapes serve to stabilize the fabrication process by providing stabilizing columns passing through the sheets 14', to minimize the flexure arm length of the struts, and also to provide for more valuable stock material that can be recycled or resold after the fabrication process is complete.

Referring still to FIGS. 2 and 4 perforation process of process block 21 may preserve a frame 26 around the periphery of the sheet 14 for dimensional stability and for handling by the carrier track 16. The perforation process of process blocks 21 may further cut a registration mark 28, for example, in each corner of the sheet 14 in the frame 26 used for later alignment. The carrier track 16 may lock the position of the sheet 14 during this perforation process of process block 21 so that the registration marks 28 cut during the perforation process have a consistent registration with the islands 22 cut during the perforation process.

Referring also momentarily to FIG. 3, the struts 24 are desirably thick enough to provide good rigidity to the sheet 14 and to accurately stabilize the islands 22. The struts 24, however, need not have uniform dimension over their length but may have narrower necks 29 connecting the struts 24 to the islands 22. This neck 29 may be advantageous also when the strut 24 approaches an edge of the island 22 at an oblique angle. The thinning of the necks 29 provide an easy release point between the islands 22 and the struts 24 by concentrating stress at this point for breaking or the opportunity for chemical erosion while allowing the remainder of the struts 24 to be substantially stronger for good location and electrical conductivity among the parts of the sheet 14. In one nonlimiting example, the struts 24 may have a width measured in the plane of the sheet 14 of less than 1 mm and a neck may have a width of less than 0.1 mm.

Referring again to FIG. 1, after the perforations have been formed in the sheet 14, the sheet 14 is moved by the carrier track 16 to a lamination/fusing station 30 where it is added on top of a print bed 32 or on top of a stack of one or more previously fused sheets 14' in turn supported by the print bed 32. As each sheet 14 is added to the stack of previously fused sheets 14', the print bed 32 may be moved downward so that the height at which the sheet 14 is received is constant. Registration cameras 36 may recognize the registration marks 28 previously provided in the sheets 14 to ensure proper registration of the new sheet 14 with the previously fused sheets 14' (which were also registered in this manner) as indicated by process block 37 of FIG. 4.

Once registration is obtained, a tacking laser 38 working through galvanometer driven mirror 40 (or electromagnetic deflection for electron beam) may optionally tack various locations of the sheet 14 to the uppermost underlying sheet 14' to prevent shifting between these two sheets during a fusing process. This tacking provides localized fusion of the two layers as indicated by process block 41 of FIG. 4 requiring little melting and therefore can be performed rapidly. The invention contemplates other possible tacking techniques may be used including the use of spot welding, electron beam welding, ultrasonic welding, a sintering roller press and the like.

At succeeding process block 42 of FIG. 4, and referring still to FIG. 1, an energy beam heater 44 may then expose the upper surface of the sheet 14 to heating energy to fuse the sheet 14 to the uppermost surface of the underlying sheets 14'. This fusing energy is controlled to melt the sheet 14 at its interface with sheet 14' to fuse these two sheets together quickly while minimizing horizontal migration of the metal material and preventing the softening or melting of lower sheets 14'. In this regard, the energy beam heater 44 provides precise timing (fast starting and stopping) of heat energy in contrast to a radiant heater or the like.

In one example, the energy beam heater 44 may be provided by an electron beam applied simultaneously over a substantial contiguous area, for example, at least one square centimeter, or at least a quarter of the sheet 14 or the entire sheet 14 to provide high throughput through parallelization of the fusing process. The area of the beam need not be contiguous, however, and the invention contemplates, for example, that a cathode comb electron beam may be used as described in U.S. Pat. No. 9,981,312 assigned to the assignee of the present invention and hereby incorporated by reference. Similarly, the wide area beam may be made up of multiple laser or electron points scanned in tandem. The invention contemplates other possible heating sources including IR beams, UV beams, optical beams, lasers, masers, x-rays, particle beams including protons, neutrons, carbon atoms and other atomic beams, and radiofrequency and inductive heaters operating on eddy current heating and the like. In the cases where the energy beam is charged particles, again, the ability to ground the entire sheet 14 greatly promotes efficiency of the heating by attracting and focusing the energy beam over the surface of the sheet 14.

Alternatively, the energy beam heater 44 may be a focused beam energy in the form of light, electrons, ions, protons, or the like, which may be useful for other embodiments described below. The sheet fusing process may be conducted in a vacuum or partial vacuum to prevent significant amounts of gas being entrained in the part that could create a void that would weaken the part.

At the conclusion of fusion process of process block 42 per FIG. 3, the islands 22 of the sheet 14 will be fused over their entire surface with islands 22 of the sheet 14' to become integrally joined by inter-melting. The struts 24 of the mesh areas 20 may also be fused where they of overlap with other struts 24 over the mesh area 20 when a broad area energy beam heater 44 is used. This fusing may be minimized by staggering the struts 24 of successive sheets 14 thereby keeping the struts thin in the dimension of the stack of the final assembled set of sheets 14'. When the energy beam heater 44 is a focused energy beam, the mesh areas 20 may not be fused.

It will be appreciated that the mesh areas 20, as well as stabilizing the locations of the islands 22 within the plane of the sheet 14 allow the islands 22 to have shapes that may extend in cantilever beyond the outlines of islands 22 on previous sheets 14' while still being fully supported by a mesh. In this regard, the mesh must provide a continuously self-supporting network to support not only itself but also the islands 22 for example with respect to other supported portions of the sheet 14. In this way the mesh areas 20 eliminate the need for gradual build out of cantilevered areas of the solid parts. To the extent that struts 24 on upper sheets 14 need to cross into the areas of islands 22 and a broad area energy beam is used struts 24 may be further thinned in the dimension of the plane of the sheet 14 to minimize fusing of strut material to the 3D part being formed.

After the step of fusing per process block 42, or in parallel with this process, the above-described steps may be repeated with a new sheet 14 being registered at the perforation station 18 to be perforated according to the next layer in the sliced model. Each of the processes of process blocks 19, 21, 37, 41, and 42 is repeated for each layer until the full three-dimensional solid has been assembled. Then, as indicated by process block 50, the printed solids produced by the assembled islands 22 may be released from the mesh areas 20 per process block 50.

The releasing process of process block 50 may employ mechanical separation of the mesh area 20 from the printed part by tearing, cutting, peeling, or shearing at the point of attachment of the struts 24 to the islands 22 now fused together. Alternatively, electrolytic methods may be used, for example, to etch away at the neck 29 of the struts 24 (for example, shown in FIG. 3) until the part is fully released. An incidental etching of the outer surfaces of the fabricated three-dimensional part may be precalculated and used to increase the printed part slightly to accommodate this effect.

Supporting columns providing solid materials other than the desired printed part also made up of islands 22 may also be removed from the mesh area 20 at this time and sold as stock or otherwise recycled. As noted, these larger supporting columns have improved recycling value when compared to mesh material.

When the energy beam heater 44 is a focused and steerable beam, some or all of the releasing process can be done by vaporization of the mesh connections to the islands 22 by the energy beam heater 44. In some embodiments this release process may occur after each fusing of each sheet 14. When a wide area energy beam heater 44 is used, a focused energy beam may also be used, for example, in the form of a higher energy tacking laser 38 to remove this mesh area 20.

Referring to FIGS. 1 and 4, the processes of FIG. 4 will be implemented by computer control using a controller 43, for example, having one or more processors 49 communicating with a memory 45 holding a stored program 46. The memory 45 may also hold a 3D model file 47 of the solid object to be printed. The controller 43 may receive signals from the registration cameras 23 and 36, and may provide control signals to the laser 27, the galvanometer driven mirror 25, the energy beam heater 44, the galvanometer driven mirror 40, and the laser 38, as described above to control these per the stored program 46. The stored program 46 may use slices of the model file 47 and add the necessary mesh structure and control these components attached accordingly. The controller 43 may communicate with a standard computer terminal 48 for providing output or receiving input from a human operator.

Referring now to FIGS. 5 and 6, a hybrid 3D printer 10' may be produced by removing the perforation station 18 of FIG. 1 to be replaced by an in-printing station 52. In this hybrid 3D printer 10', the sheets 14 of FIG. 1 may be a pre-prepared mesh, for example, in one nonlimiting example, a woven mesh of 304 stainless steel wire having a mesh opening size of 0.0015 inches. At the in-printing station 52, a printhead 54 controlled by a controller 43 may selectively deposit metal powder and binding material onto the mesh of the sheets 14 to form the island 22. This printing process which provides an additive manufacturing step to the inherent subtractive manufacturing provided by the mesh, is indicated by process block 21' which replaces process block 21 in FIG. 4.

The hybrid 3D printer 10' may make use of a wide variety of mesh materials that are widely available commercially as produced by weaving technologies. This mature technology presents an extremely low cost and readily available substrate for the sheets 14.

As another example, the perforation station 18 of FIG. 1 may remain to form the custom selectively modified sheet to form a custom mesh from sheet, in which case the printhead 54 in FIG. 5 may still be used to selectively deposit metal powder and binding material on the mesh of the sheets 14 to form the island 22, composing a hybrid 3D printer 10' that now includes the perforation station.

Referring now to FIG. 7, in an alternative embodiment, the sheet tray 12 of FIG. 1 may be replaced with a roll 56 of sheet material of a type used in the sheets 14 in the process described above with respect to FIG. 1 or a mesh material of a type used for the sheets 14 in the process described with respect to FIG. 5. Under the control of a servo motor and rotary encoder unit 60, which may control the precise rotation and tensioning of the roll 56, the sheet 14 may be unspooled from the roll 56 to pass as a planar sheet to the perforation station 18 or the in-printing station 52 described above. As before, the perforation station 18 (as shown) or in-printing station 52 may create the islands 22.

Registration marks may be cut or printed in the margins of the sheet to be detected by a registration reader 58, for example, a camera or optical interrupter device, and the material rolled onto a second roll 62 also operated by a servo motor/rotary encoder 64 maintaining tension on the sheet 14 from the roll 56 and providing a precise registration of material on the roll 62. This configuration allows sufficient space for processing of the material between roll 56 and roll 62 while allowing the in-printing machine to be contained in a compact area.

Material on the roll 62 may be fused by the areal energy beam heater 44 as described with respect to FIG. 1 or by a high-powered fusing laser or electron beam 66 scanned with a galvanometer mirror 68 or by electromagnetic means to similar effect.

In the case where the sheet 14 is a woven mesh or the like, the additive process of FIG. 5 may be implemented by replacing the perforation station 18 with the in-printing station 52 or including the in-printing machine to sheets after being processed by the perforation station.

In both cases, the program 46 may be adjusted by predistortion of the islands 22 to accommodate the curved geometry of the roll 62 and the changing outer circumference of the roll 62 as it accumulates printed layers.

Referring momentarily to FIGS. 8 and 9, it will be understood that a cross-section through a printed solid 70 of the sheets 14' produced per the planar geometry of the system of FIG. 1 will generally be mutually parallel as shown in FIG. 8. In contrast, the printed sheets 14' produced on the roll 62 will generally have an arcuate form. Nevertheless, the outer peripheries 72 of the solids 70 produced by either the process of the system of FIG. 1 or FIG. 7 may be identical, being determined by the definition of the islands 22 rather than the geometry of the layers. In this case, the slicing operations of program 46 may be adjusted to accommodate the arcuate geometry of the system of FIG. 7. This compensation expands by scaling the length of the islands 22 along the circumference of the roll 62 (as it is constantly changing) so that the cylindrical arcs of sheets 14' exactly span the peripheries 72 of the solid 70 of FIG. 9. This scaling may be performed by calculating path lengths along the necessary arcs within the boundaries 76. In addition, the program 46 may make similar scaling expansion to the separation between the islands 22 along that circumferential axis, this scaling which again changes as the circumference of the roll 62 increases and which is cumulative as layers are added.

Referring now to FIG. 10, it will be appreciated that the islands 22 in any of the above-described embodiments may have internal mesh regions 74, for example, to provide lighter weight construction. In some embodiments, the outer periphery of the islands 22 may be free from mesh to provide a solid outer surface in the ultimate printed shape. These outer surfaces of each island will be fused to corresponding solid outer surfaces of succeeding and preceding sheets 14 in this case, and an uppermost and lowermost island 22 may be continuous to provide for a cap and base fully enclosing the internal mesh region 74 if desired. The internal mesh region 74 may be fully enclosed by solid material in the ultimately printed solid 70. The struts forming the internal mesh sheets 14 may also be fused together over their entire areas or at spaced intersections to provide increased rigidity and solidity to this internal structure.

Figure 11:
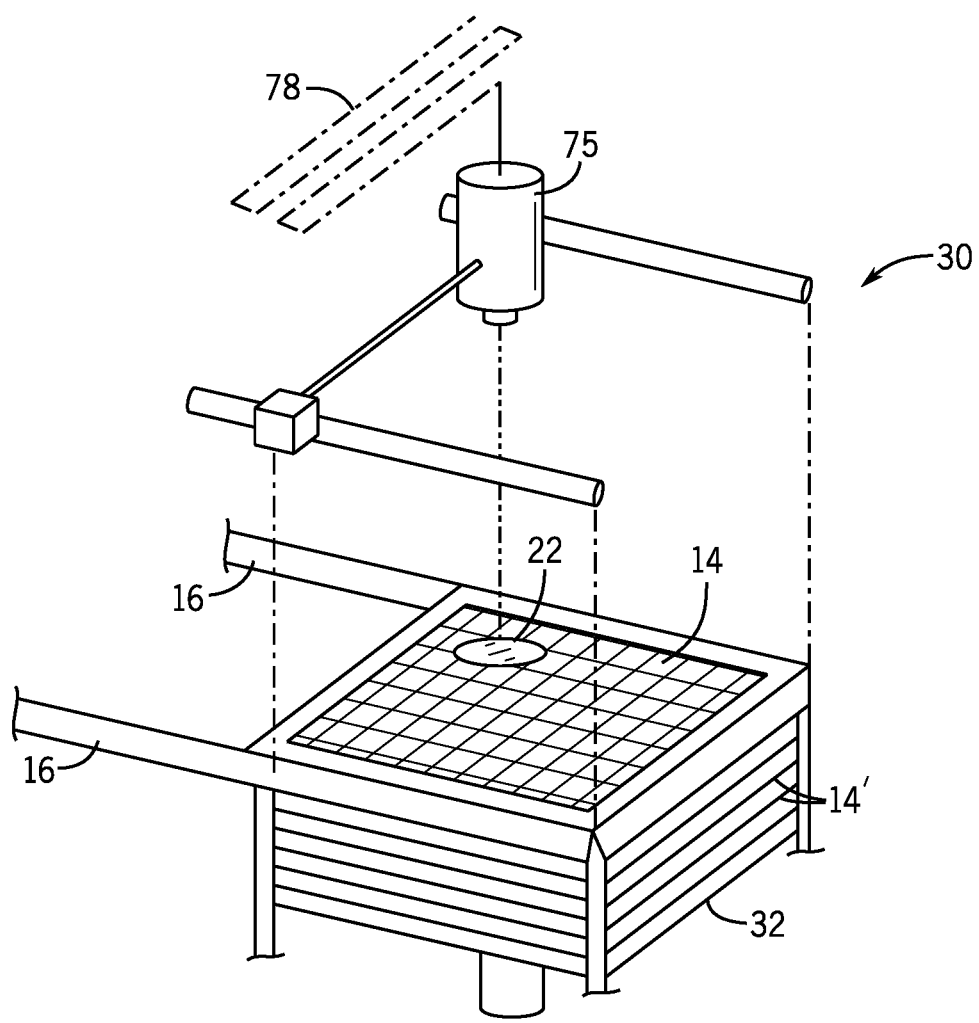
FIG. 11 is a fragmentary view of a fusing station that may replace the fusing station of FIG. 1 for providing melting of the mesh material in the manner of powdered metal.

Referring now to FIG. 11, in an alternative embodiment, the perforation station 18 and the in-printing station 52 may be eliminated and the sheets 14 may be a pre-prepared mesh, for example, of a woven material as described above. In this case, the lamination/fusing station 30 may provide for a high-powered scannable laser 75 or other similar energy beam such as an electron beam movable in a raster pattern 78 or other scanning pattern by controller 43 above the mesh sheet 14 to fuse islands 22 to the preceding sheets 14'. In this case the laser 75 or other energy beam uses the mesh material as a feedstock in the manner of a powder material, melting the mesh to fused together to form the islands 22 that are defined purely by the program 46, and prior to fusing, the sheet 14 may be a uniform mesh over the entire surface of the sheet 14 requiring no additional preparation. By employing a mesh rather than a powder, many of the drawbacks to powder described above are avoided and the benefits of an integral grounded and stable surface are provided. Alternatively, the perforation station may be used to produce the custom mesh from sheet that is then melted as in FIG. 11, transforming the custom mesh from sheet into a solid.

Empirical measurements may be used to determine the ultimate thickness of the fully fused layer, which will generally be thinner than the mesh material of the sheet 14 because of the infilling of the mesh openings as the mesh melts. Portions of the sheet comprising the mesh area 20 outside of the islands 22 may be fully severed after the fusing process to eliminate interference between the layers of the sheets 14 caused by greater thickness of the unfused mesh than the fused islands. Alternatively, this mesh area 20 may be left in place as required for scaffolding of subsequent layers. In this latter case, the mesh is sized to provide sufficient capillary retention of liquefied material of the upper fused layers above unfused mesh to allow for cantilevered sections of the solid object being printed. The spacing of the cavities within the mesh may be adjusted to accommodate for density changes when melting the perforated sheet into a solid such that the layer height stays constant.

It will be appreciated that this technique can also be employed in the system of FIG. 7 by providing a mesh material on roll 56 and eliminating the perforation station 18 and positioning the laser 75 at the lamination/fusing station 30. Generally, it will be further understood that the perforation station 18 or in-printing station 52 may in fact be positioned at the lamination/fusing station 30, and in the latter case, the additive printing may be done on top of the stack of fused sheets 14'. More generally, the perforation process and the printing process may be combined as desired.

Referring again to FIG. 8, it will be appreciated that the mesh described above, either woven, or cut using the perforation station 18 discussed above, may be sintered or otherwise fused together into a solid 72 to provide a material that may be subject to other processing, for example, subtractive machining or the like. The sintering process may employ the energy beam discussed above or may, for example, be performed by compressing the layers together mechanically while heating them in an oven or the like until they fuse into an integrated solid while preserving the voids inherent in the mesh structure. The result is a machinable material having a light weight as a result of an internal mesh structure.

The fusing process of the present invention involves a melting of materials to cause them to intermingle and thus may be distinguished from an adhesive attachment.

While the present invention provides particular value with respect to the fabrication of metal parts, it is not limited to uniform metal parts but may be used with hybrid ceramic/metals and the like in which metal layers are melted to join them to adjacent layers. When a pre-prepared mesh material is used, the invention contemplates both a conventionally woven material having warp and woof wires interconnected through their weaving process as well as nonwoven materials providing comparable structure without the regular warp and woof. It will be appreciated that a woven mesh may be replaced with a similar structure having micro perforations simulating the gaps between warp and woof fibers but with integrally attached intersections and thus mesh does not necessarily denote a woven mesh or any particular shape of mesh opening. The term "hole" as used herein is not intended to be limited to circular holes but may include openings and apertures of arbitrarily shaped continuous or discontinuous boundaries.

The process described herein of fabricating three dimensional objects by applying a set of mesh sheets with islands successively in a stack and fusing them with an energy beam may also be applied to a situation where the sheets are added on top of a substrate (solid or mesh) of an already existing structure or component, to allow the process to be used to repair or modify existing equipment with the same advantages already discussed but without the disadvantages of powder as is typical with repair processes such as directed energy deposition using powder feedstock.

It will be appreciated that the system described above in its various embodiments may be useful in fabricating what is effectively "structured metal foam" by laminating together micro perforated sheets or woven material, (aligned or staggered between layers) by a selective fusing of the layers that preserves the mesh structure. Such material could be useful in ballistic shielding, heat exchangers, lightweight construction material and energy absorbing structural components. By using the present system, the build volume and density (fill fraction) may be more accurately controlled and waste is reduced. The present invention may also allow thinner structures and the formation of parts of arbitrary shape and dimension that are homogenous or inhomogenous, the latter having solid regions and foam regions and abrupt or gradual transitions between regions.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to control or processor can be understood to include one or more processors that can communicate in a stand-alone and/or a distributed environment(s) and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A three-dimensional printer for fabricating a predefined structure comprising:
   a laminator receiving a layer of mesh sheet material having islands of material defining a layer of the predefined structure and surrounded by a mesh network outside the layer of the predefined structure and applying the layer of mesh sheet material to previous applied layers of mesh sheet material;
   a wide area fusing energy beam directable to an exposed surface of an outermost layer of the applied layers of mesh sheet material, after the outermost layer is applied to the previously applied layers; and
   a controller configured to receive a definition of the predefined structure and coordinate operation of the laminator and fusing energy beam according to the received predefined structure to controllably melt the outermost layer over an area including the islands and the mesh network to simultaneously melt the islands and the mesh network, and thereby fuse each applied layer from the laminator, sequentially, to a previously applied layer using the fusing energy beam in a repeating operation to produce an integrated solid volume of mutually fused layers forming the predefined structure from the islands.

2. The three-dimensional printer of claim 1 further including a hole-former receiving sheet material and cutting holes in the sheet material to produce the layer of mesh sheet material before the layer of mesh sheet material is applied to previously applied layers of sheet material.

3. The three-dimensional printer of claim 2 wherein the controller executes a program stored in a non-transitory medium to control the hole- former to produce the mesh network around the islands of the sheet material, the islands fused to form the integrated solid volume, the mesh network supporting the islands during the fusing operations.

4. The three-dimensional printer of claim 3 wherein the mesh network is sized to be removed from the integrated solid volume of mutually fused layers through at least one of bead blasting, tearing, or electrolytic erosion.

5. The three-dimensional printer of claim 3 wherein the mesh network around the islands provides narrowed neck portions joining struts of the mesh network to the islands, wherein the narrowed neck portions are adapted to break during at least one of bead blasting, tearing, or electrolytic erosion.

6. The three-dimensional printer of claim 3 wherein the islands include internal perforations.

7. The three-dimensional printer of claim 1 further wherein the fusing energy beam is an area beam simultaneously directing fusing energy to the exposed surface of the outermost layer over an area of at least one square centimeter.

8. The three-dimensional printer of claim 1 wherein the fusing energy beam is a steerable beam adapted to fuse successive layers of the mesh sheet material.

9. The three-dimensional printer of claim 1 further adapted to receive the mesh sheet material and selectively print fusible material onto the mesh sheet material to produce the islands fusible by the fusing energy beam to form the integrated solid volume with a remaining mesh supporting the islands during the fusing operations.

10. The three-dimensional printer of claim 9 wherein the printer is adapted to print a metal powder fusible to the mesh sheet material by the fusing energy beam.

11. The three-dimensional printer of claim 1 wherein the laminator produces a stack of planar layers supported on a support surface.

12. The three-dimensional printer of claim 1 wherein the laminator produces a roll of curved layers wrapped around a roller.

13. The three-dimensional printer of claim 1 further including a tack welder tacking each applied layer from the laminator to a previously applied layer of mesh sheet material prior to a fusing of each applied layer from the laminator to a previously applied layer of mesh sheet material using the fusing energy beam.

14. A three dimensional printer for fabricating a structure comprising:
a laminator receiving a layer of mesh sheet material and applying the layer of mesh sheet material to previously applied layers of mesh sheet material;
a wide area fusing energy beam directable to an exposed surface of an outermost layer to controllably melt the outermost layer of the applied layers of mesh sheet material, after the outermost layer is applied to the previously applied layers, simultaneously over an area including the structure and outside of the structure to simultaneously melt the structure and outside the structure;
a controller configured to coordinate operation of the laminator and fusing energy beam to sequentially fuse each applied layer from the laminator to a previously applied layer using the fusing energy beam in a repeating operation to produce an integrated solid volume of mutually fused layers forming the fabricated structure;
wherein the fusing energy beam is an area beam simultaneously directing fusing energy to the exposed surface of the outermost layer over an area of at least one square centimeter; and
wherein the fusing energy beam is at least one electron beam directed to the exposed surface of the outermost layer, and the printer further includes a grounding electrode for grounding the outermost layer with respect to the at least one electron beam.

15. A method of fabricating a three-dimensional object using a three-dimensional printer for fabricating a predefined structure, the printer comprising:
a laminator receiving a layer of mesh sheet material having islands of material defining a layer of the predefined structure and surrounded by a mesh network outside the layer of the predefined structure and applying the layer of mesh sheet material to previous applied layers of mesh sheet material;
a wide area fusing energy beam directable to an exposed surface of an outermost layer of the applied layers of mesh sheet material, after the outermost layer is applied to the previously applied layers; and
a controller configured to receive a defmition of the predefined structure and coordinate operation of the laminator and fusing energy beam to simultaneously controllably melt the outermost layer over an area including the islands the mesh network, and thereby fuse each applied layer from the laminator, sequentially, to a previously applied layer using the fusing energy beam in a repeating operation to produce an integrated solid volume of mutually fused layers forming the predefined structure from the islands; the method comprising:
(a) applying a set of mesh sheets successively in a stack;
(b) as each individual mesh sheet is applied to the stack, applying an energy beam to an exposed surface of the individual mesh sheet to fuse the individual mesh sheet to a previously fused underlying mesh sheet to create a set of islands together fused to form a predetermined three-dimensional shape, the islands surrounded by mesh; and
(c) separating the predetermined three-dimensional shape formed by the fused islands from the surrounding mesh by at least one of bead blasting, tearing, or electrolytic erosion.

16. The method of claim 15 wherein the mesh sheets are woven metal mesh.

17. The method of claim 15 wherein the mesh sheets are a metal mesh having printed metal powder forming the islands.

18. The method of claim 15 wherein the energy beam selectively melts each individual mesh sheet to form the fused islands.

19. The method of claim 15 further including, before (a), cutting holes in a sheet material to form each mesh sheet, each mesh sheet including an island being a portion of the three-dimensional object and a mesh of struts surrounding the island.

\* \* \* \* \*